(12) United States Patent
Belanger

(10) Patent No.: US 9,469,982 B2
(45) Date of Patent: Oct. 18, 2016

(54) GRATE APPARATUS AND METHOD FOR COVERING AND OPENING A CHANNEL IN A VEHICLE WASH

(71) Applicant: Michael J. Belanger, Northville, MI (US)

(72) Inventor: Michael J. Belanger, Northville, MI (US)

(73) Assignee: Belanger, Inc., Northville, MI (US)

( * ) Notice: Subject to any disclaimer, the term of this patent is extended or adjusted under 35 U.S.C. 154(b) by 155 days.

(21) Appl. No.: 14/230,145

(22) Filed: Mar. 31, 2014

(65) Prior Publication Data

US 2015/0275498 A1   Oct. 1, 2015

(51) Int. Cl.
| | |
|---|---|
| *E03F 5/06* | (2006.01) |
| *E04C 2/42* | (2006.01) |
| *B60S 13/00* | (2006.01) |
| *E03F 3/04* | (2006.01) |

(Continued)

(52) U.S. Cl.
CPC .................. *E03F 5/06* (2013.01); *B60S 13/00* (2013.01); *E03F 3/046* (2013.01); *E04C 2/42* (2013.01); *E04C 2/428* (2013.01); *E04H 5/06* (2013.01); *E06B 5/01* (2013.01); *A01K 1/0151* (2013.01); *B60S 3/00* (2013.01); *E04H 4/082* (2013.01); *E06B 1/70* (2013.01)

(58) Field of Classification Search
CPC ..... E03F 5/06; E03F 2005/061; E03F 3/046; E03F 19/10; E03F 2005/063; E04H 5/06; E04H 4/082; E04H 6/428; B60S 3/004; E06B 2009/1555; E06B 2009/1561; A01K 1/0151; E04C 2/42; E04C 2/421; E04C 2/428; E04D 13/12

USPC ...... 52/5; 119/450, 529; 404/4, 36; 182/196; 160/133
See application file for complete search history.

(56) References Cited

U.S. PATENT DOCUMENTS

| | | | | |
|---|---|---|---|---|
| 1,728,851 | A | * | 9/1929 | Blakely ...................... E06B 5/01 160/133 |
| 2,042,002 | A | * | 5/1936 | Hovey .................... B63B 19/21 160/133 |

(Continued)

FOREIGN PATENT DOCUMENTS

| | | |
|---|---|---|
| DE | 9213475 U1 | 12/1992 |
| DE | 29816307 U1 | 11/1998 |

(Continued)

OTHER PUBLICATIONS

International Search Report, Aug. 7, 2015, 6 pages.

*Primary Examiner* — Robert Canfield
(74) *Attorney, Agent, or Firm* — John S. Artz; Dickinson Wright PLLC

(57) ABSTRACT

A grate apparatus for covering a pit defined in a floor of a vehicle wash facility includes a plurality of rigid rung pieces having a first end, a second end, an upper surface and a lower surface. The rigid rung pieces are secured in generally parallel and spaced apart fashion by a plurality of flexible strap members. The flexible strap members are secured to each of the rung pieces by a plurality of fasteners. The grate apparatus is moveable between an unwound position where the first end of each of the plurality of rigid rung pieces rests on one of a pair of spaced apart rails located adjacent the pit and the second end of each of the plurality of rung pieces rests on the other of the pair of spaced apart rails and a wound position wherein the plurality of rung pieces and the plurality of flexible straps are oriented in generally coiled position around a centerline.

10 Claims, 10 Drawing Sheets

(51) Int. Cl.
  *E06B 5/01* (2006.01)
  *E04H 5/06* (2006.01)
  *A01K 1/015* (2006.01)
  *E04H 4/08* (2006.01)
  *B60S 3/00* (2006.01)
  *E06B 1/70* (2006.01)

(56) References Cited

U.S. PATENT DOCUMENTS

| | | | | |
|---|---|---|---|---|
| 3,033,310 A | * | 5/1962 | McLeod | E06C 1/56 182/196 |
| 3,078,954 A | * | 2/1963 | MacLeod | E06C 1/56 182/196 |
| 3,228,376 A | * | 1/1966 | Conover | A01K 1/0151 119/447 |
| 3,381,424 A | * | 5/1968 | Butler | E04D 13/10 52/148 |
| 3,710,529 A | * | 1/1973 | Pass | E04C 2/423 52/108 |
| 3,722,474 A | * | 3/1973 | Vickstrom | A01K 1/0151 119/529 |
| 3,862,464 A | * | 1/1975 | Arens | A47L 23/24 15/217 |
| 4,047,257 A | * | 9/1977 | Bondarchuk, Sr. | B63C 9/32 14/27 |
| 4,234,973 A | * | 11/1980 | Vetter | E04H 4/082 108/68 |
| 4,341,253 A | * | 7/1982 | Eyerle | E04H 5/06 160/133 |
| 4,568,587 A | * | 2/1986 | Balzer | A47L 23/26 428/192 |
| 4,574,861 A | * | 3/1986 | Mao | E06B 9/15 160/133 |
| 4,762,242 A | * | 8/1988 | Harris | E04H 5/06 137/234.6 |
| 4,771,586 A | * | 9/1988 | Schmidt | A47L 23/24 15/202 |
| 4,815,155 A | * | 3/1989 | Sommers | A47C 21/06 5/417 |
| 4,966,217 A | * | 10/1990 | Dechambeau | E04H 5/06 160/118 |
| 5,738,160 A | * | 4/1998 | Rice | E04H 5/06 160/201 |
| 5,746,287 A | * | 5/1998 | Durham, Jr. | A62B 5/00 182/196 |
| 5,842,746 A | * | 12/1998 | Rogers | A47C 31/10 182/196 |
| 6,269,908 B1 | * | 8/2001 | Yeamans | B63B 27/146 182/196 |
| 6,463,613 B1 | * | 10/2002 | Thompson | A61G 3/061 14/69.5 |
| 6,871,686 B2 | * | 3/2005 | Eshpar | E06B 9/15 160/133 |
| 7,090,430 B1 | * | 8/2006 | Fletcher | E01C 9/086 404/35 |
| 7,152,655 B2 | * | 12/2006 | Clauss | E06B 9/26 160/133 |
| 7,344,197 B2 | * | 3/2008 | Sanderson | A47C 13/00 297/452.63 |
| 2001/0052398 A1 | * | 12/2001 | Benedetti | F16P 3/02 160/133 |

FOREIGN PATENT DOCUMENTS

GB 2472798 A 2/2011
JP 09235774 A * 9/1997

* cited by examiner

GRATE APPARATUS AND METHOD FOR COVERING AND OPENING A CHANNEL IN A VEHICLE WASH

TECHNICAL FIELD

The present disclosure relates generally to a grate apparatus and method for covering and opening a pit located in a floor of a vehicle wash facility. More specifically, the present disclosure relates to a grate apparatus and method for covering and opening a pit located in a floor of a vehicle wash facility that is light weight and is easy to manipulate to thereby allow for more efficient cleaning of the pit.

BACKGROUND OF THE INVENTION

Grate apparatuses and methods for covering and opening pits located in the floors of vehicle wash facilities are generally known in the vehicle wash industry. These pits are typically formed in the floor of a vehicle wash facility and can house a conveyor system for a vehicle wash system. These pits are also located generally beneath a path of vehicle travel. Due to their location, a covering is generally employed to close off an upper opening of the pit. As these pits are known to collect dirt and debris that are removed from vehicles during the vehicle wash process, they require cleaning. Due to the configuration of prior grate apparatus, this process can be time consuming and very cumbersome, which can result in the pit being cleaned less frequently than needed.

An example of one such prior art grate apparatus 10 and pit is schematically illustrated in FIG. 1. As is generally known, multiple grate apparatus are required to fully cover the pit from one end of the vehicle wash facility to the other. As exemplarily shown, prior grate apparatus are typically formed of a metal material and are supported over the mouth of the pit by rails 12 located on either side of the pit. The rails 12 are generally configured to extend along the length of pit such that they could support multiple grate segments end to end in order to cover the entirety of the pit. As shown, each of these prior art grate segments can be generally rectangular in shape and can include a solid metal border 14 consisting of side portions 16 that can rest on each of the side rails 12 and end portions 18 that extend between the side portions. As shown, a plurality of cross-pieces 19 can extend between the side portions and the end portions to form an open mesh portion that is encapsulated by the solid border. The mesh portions can include openings that allow water and dirt to flow through the grate structure into the pit.

Such prior art grate apparatuses suffer from certain drawbacks as the grate segments tend to be relatively heavy and bulky due to their rigid construction, making it difficult and time consuming for one or more vehicle wash technicians to remove the grate segments from over the mouth of the pit to expose the pit for cleaning. Also, to expose the pit, the grate segments need to be lifted and moved to a location adjacent the pit or on top of other grate segments still in place. This is particularly problematic for technicians assigned the task of cleaning the pit as it is generally desirous to quickly open and close the pit to prevent lost operation time of the vehicle wash. Further, once such grate segments have been removed from the pit during such a cleaning operation, the grate segments tend to disadvantageously take up a large amount of space in the vehicle wash facility, which tends to have limited available storage room. Replacing these grate segments can also be difficult due to the requirements that they be physically aligned. Accordingly, there remains a need for an improved grate apparatus in the vehicle wash industry that is easier for technicians to remove from and position over top of a pit in a vehicle wash facility that is more compact for storage purposes, constructed of lighter weight and easier to manipulate.

SUMMARY OF THE INVENTION

It is therefore an aspect of the present disclosure to provide a grating for covering a pit in a vehicle wash facility that is of lighter weight.

It is another aspect of the present disclosure to provide a grating for covering a pit in a vehicle wash facility that requires a smaller storage envelope.

It is a further aspect of the present disclosure to provide a grating for covering a pit in a vehicle wash facility that is easier to remove and manipulate.

It is yet another aspect of the present disclosure to provide a grating for covering a pit in a vehicle wash facility that can be self-aligning.

In accordance with the above and the other aspects of the present disclosure a retractable grating for covering a pit in a vehicle wash facility is provided. The pit includes a pair of spaced apart rails secured along a mouth thereof. The grate apparatus includes a plurality of rigid rung pieces having a first end, a second end, an upper surface and a lower surface. The grate apparatus includes a front rung piece, a back rung piece, and a plurality of intermediate rung pieces. A plurality of flexible strap members are secured to and connecting the plurality of rigid rung pieces such that the plurality of rung pieces are arranged in a generally parallel spaced apart relationship. The plurality of flexible straps have a forward end secured to the front rung piece and a rearward end secured to back rung piece of the plurality of rung pieces. A plurality of fasteners connect the plurality of flexible strap members to each of the front rung piece, the back rung piece and the plurality of intermediate rung pieces. The plurality of rung pieces are moveable between an unwound position where the first end of each of the plurality of rigid rung pieces rests on one of the pair of spaced apart rails and the second end of each of the plurality of rung pieces rests on the other of the pair of spaced apart rails and a wound position wherein the plurality of rung pieces and the plurality of flexible straps are oriented in generally coiled position around a centerline.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE PREFERRED EMBODIMENTS

Figure 1:
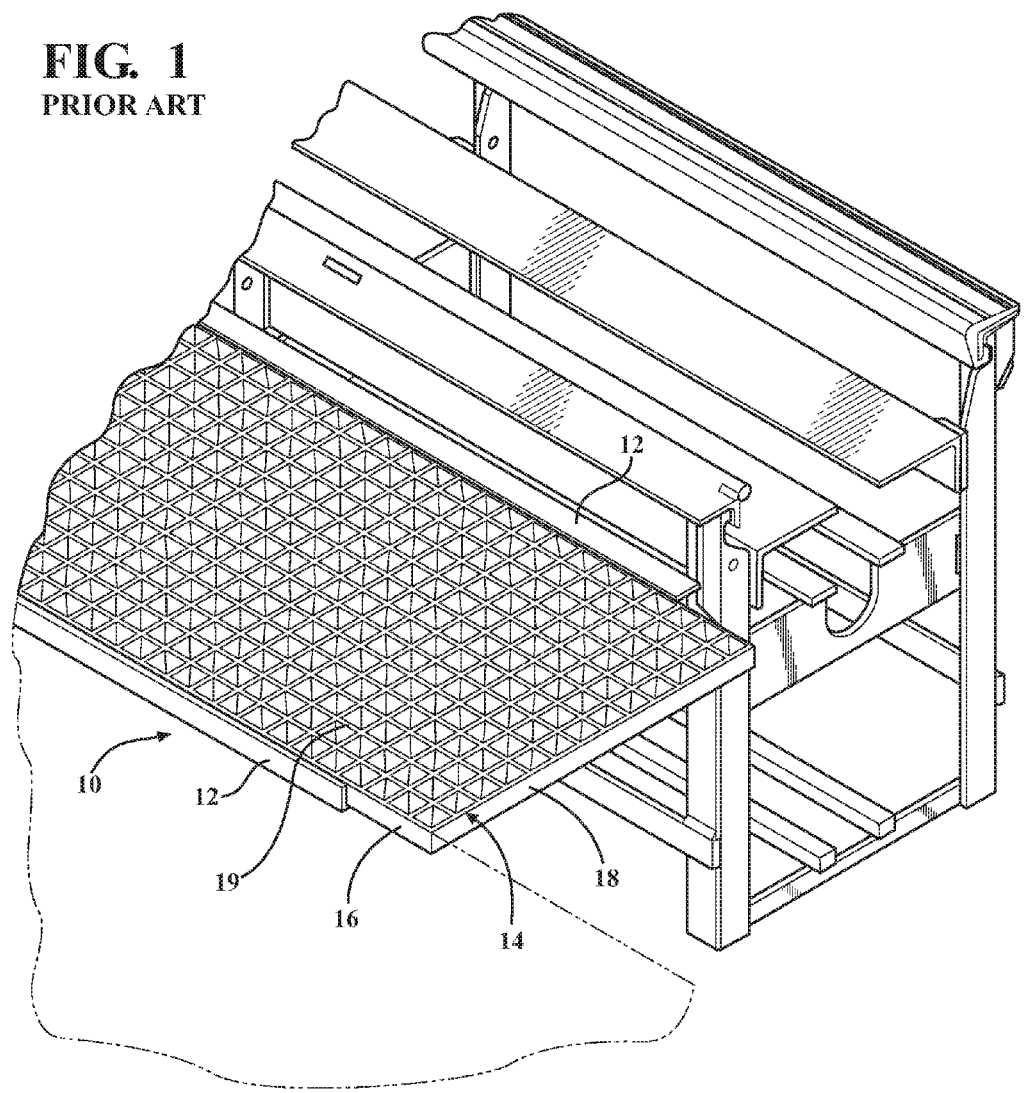
FIG. 1 is a perspective view of a grate assembly in accordance with the prior art.
Figure 2:
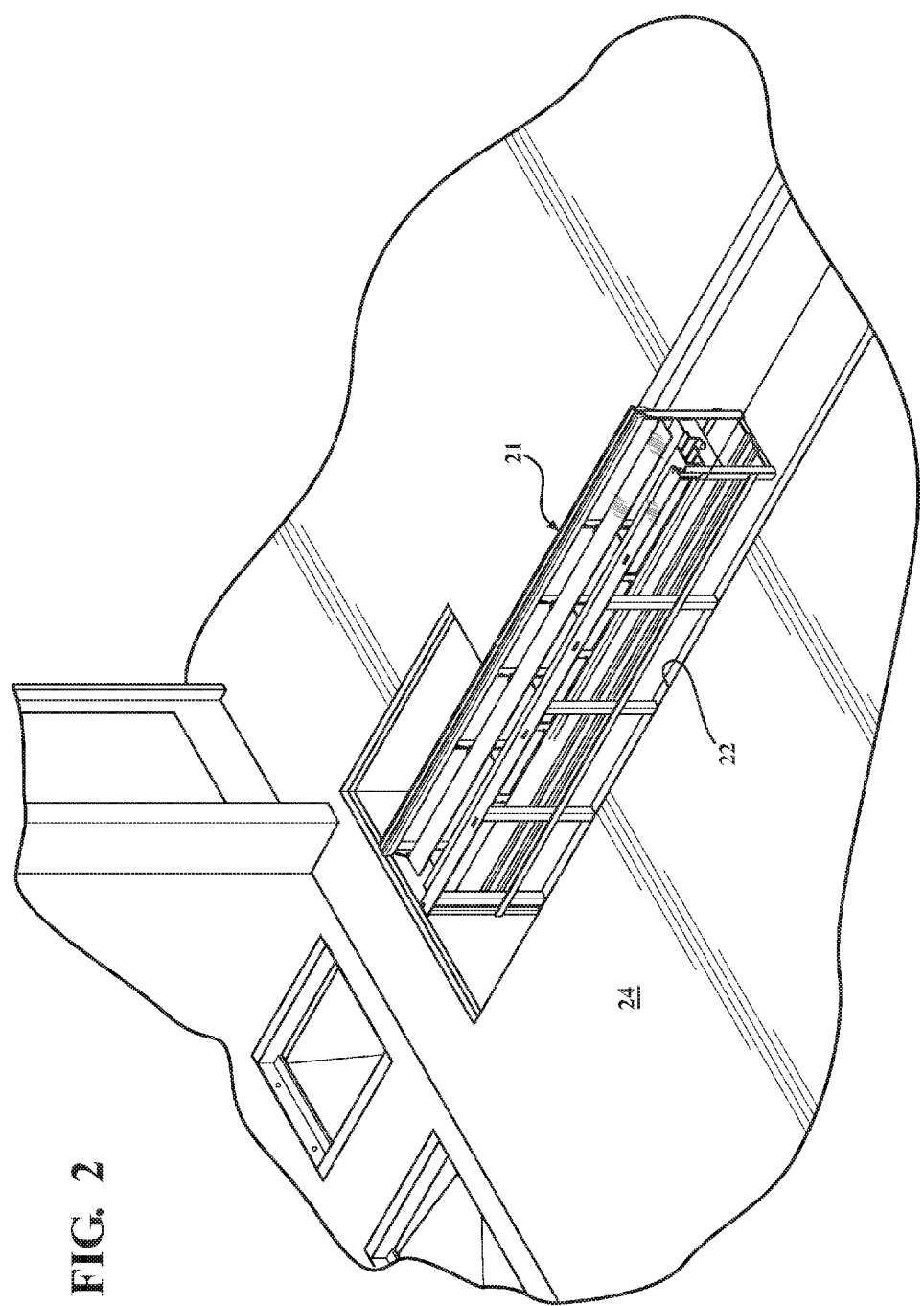
FIG. 2 is a partial perspective view of a pit for a vehicle wash system, a vehicle wash conveyor system, and a vehicle wash floor according to an aspect of the disclosure.
Figure 3:
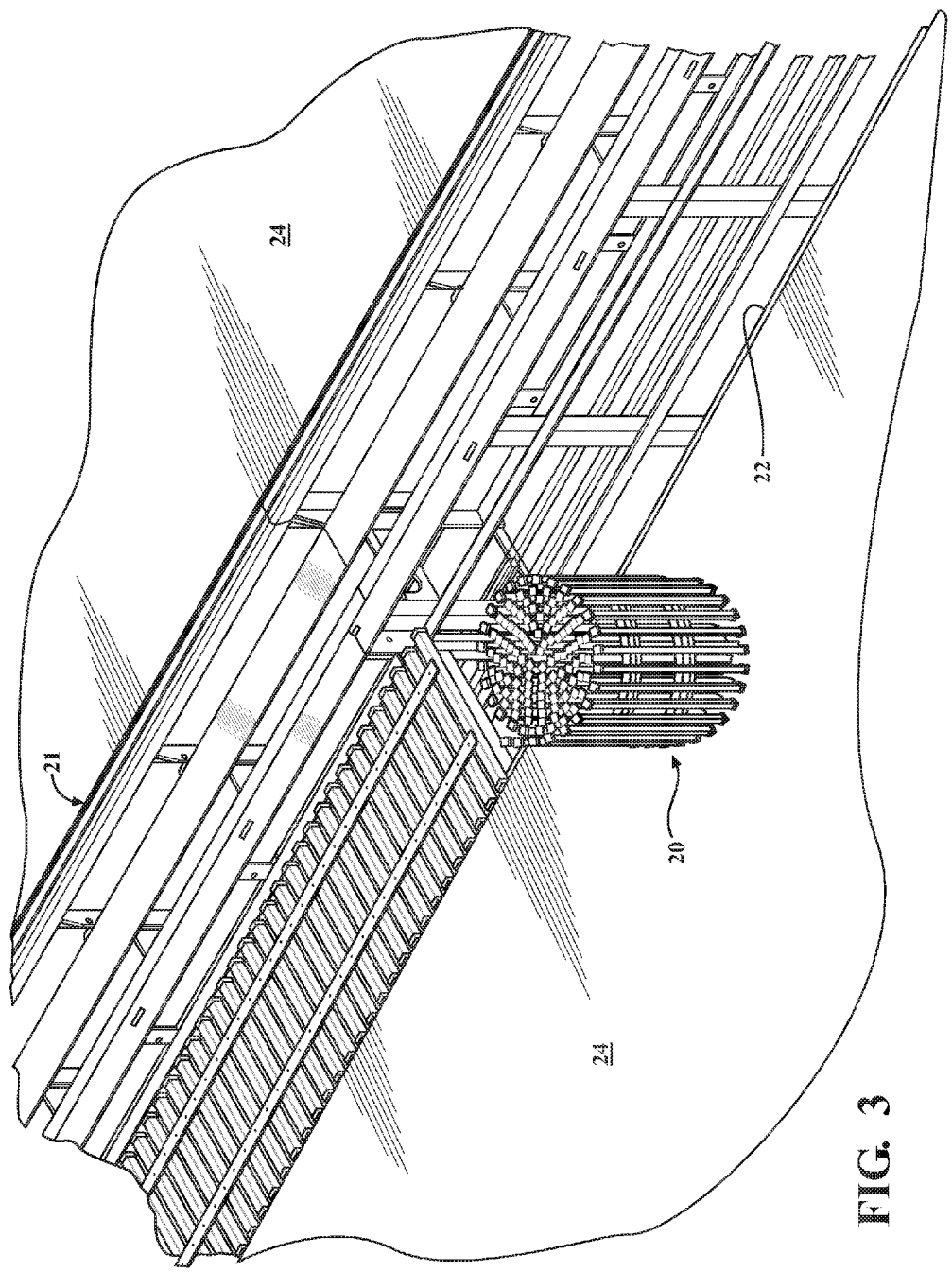
FIG. 3 is a perspective view a vehicle wash system including a grate assembly disposed in a coiled position adjacent to the pit according to an aspect of the disclosure.
Figure 4:
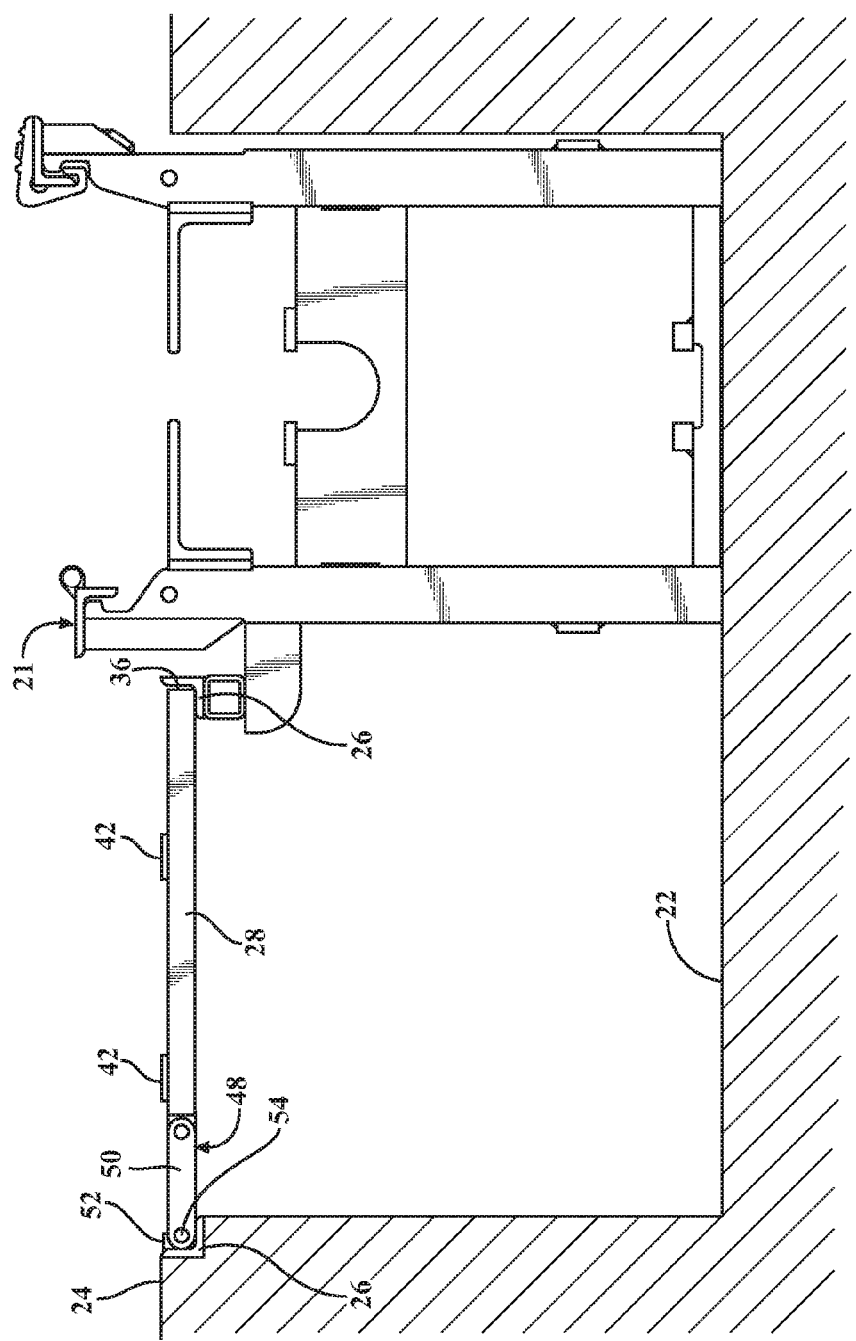
FIG. 4 is a side view of a grate assembly, a conveyor system, and a pit according to an aspect of the disclosure.
Figure 5:
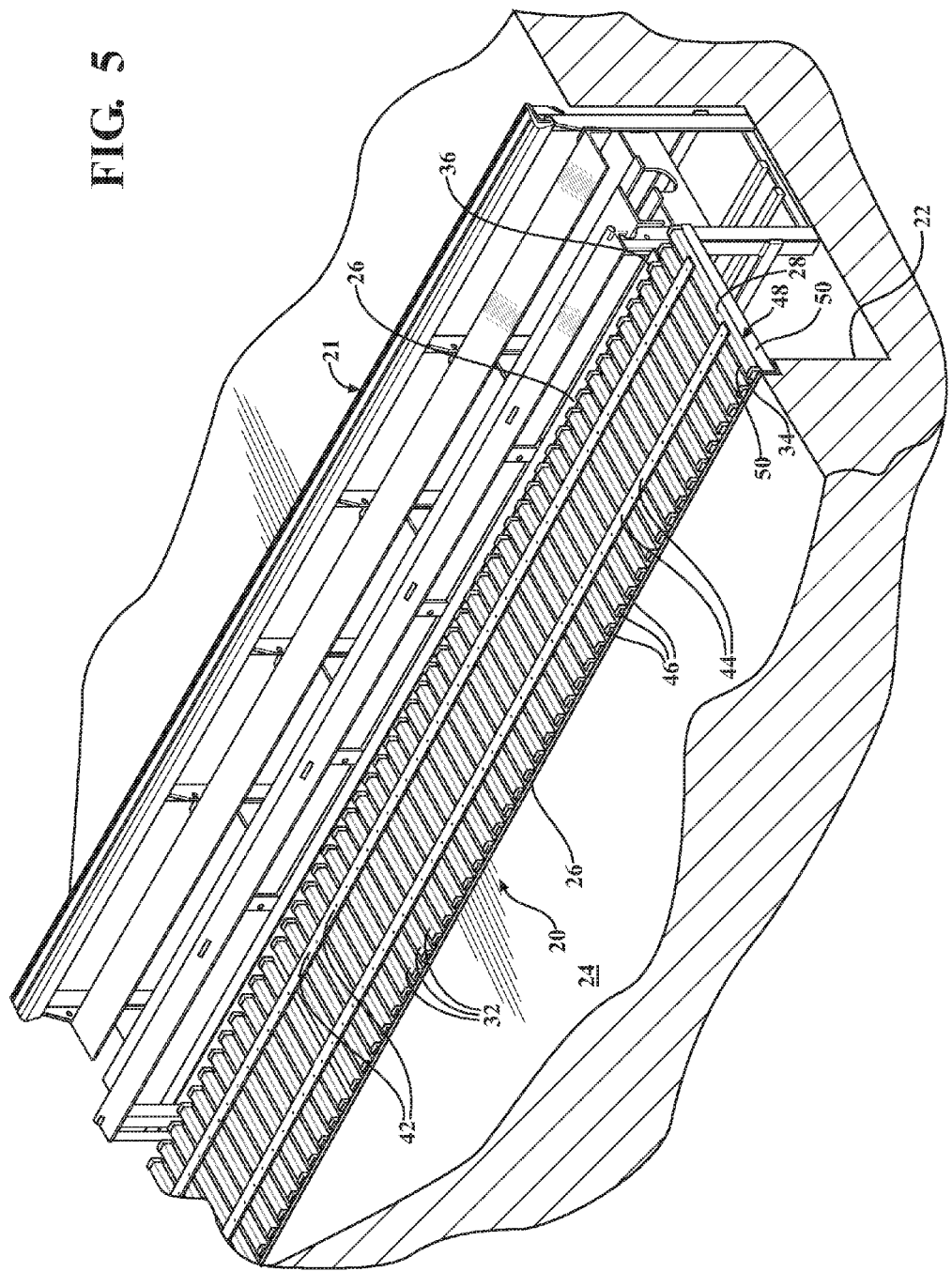
FIG. 5 is perspective view of a grate assembly, a conveyor system, and a pit according to an aspect of the disclosure.

Referring to the Figures, wherein like numerals indicate corresponding parts throughout the several views, a grate apparatus 20 is generally shown for covering a channel or pit 22 defined within a floor 24 of a vehicle wash facility. The pit can include a conveyor system 21 for moving a vehicle through the vehicle wash facility. As best presented in FIGS. 2-6 and 10, according to an aspect, the grate apparatus 20 may be configured to cover a pit 22, which includes a pair of tracks 26 that are disposed in spaced and parallel relationship with one another along the length of the pit 22. The pit 22 defines a mouth or opening 25 at an upper end thereof. However, it will be appreciated that the grate apparatus 20 could be utilized to cover a pit 22 that does not include tracks 26 could be employed to cover a variety of other structures. According to an aspect, the pit 22 may be configured with sloped walls such that water and dirt generated during the vehicle wash process can be funneled to a bottom surface for easy cleaning. According to another aspect, the pit 22 could also include a drain in the bottom surface.

As best presented in FIGS. 5-10, according to an aspect, the grate apparatus 20 can include a plurality of rails or rungs 28, 30, 32 that are secured to one another in spaced and parallel relationship. According to an aspect, the rails 28, 30, 32 could be formed of a metal material, such as stainless steel or aluminum. As shown, the rails 28, 30, 32 can have a generally rectangular shape with a square shaped cross-section. However, it will also be appreciated that the rails 28, 30, 32 could also be configured in a variety of different shapes including cylindrical. As shown, the rails 28, 30, 32 can have a first end 34 designed to lie adjacent one side of the pit 22 and a second end 36 designed to lie adjacent the other side of the pit 22.

Figure 6:
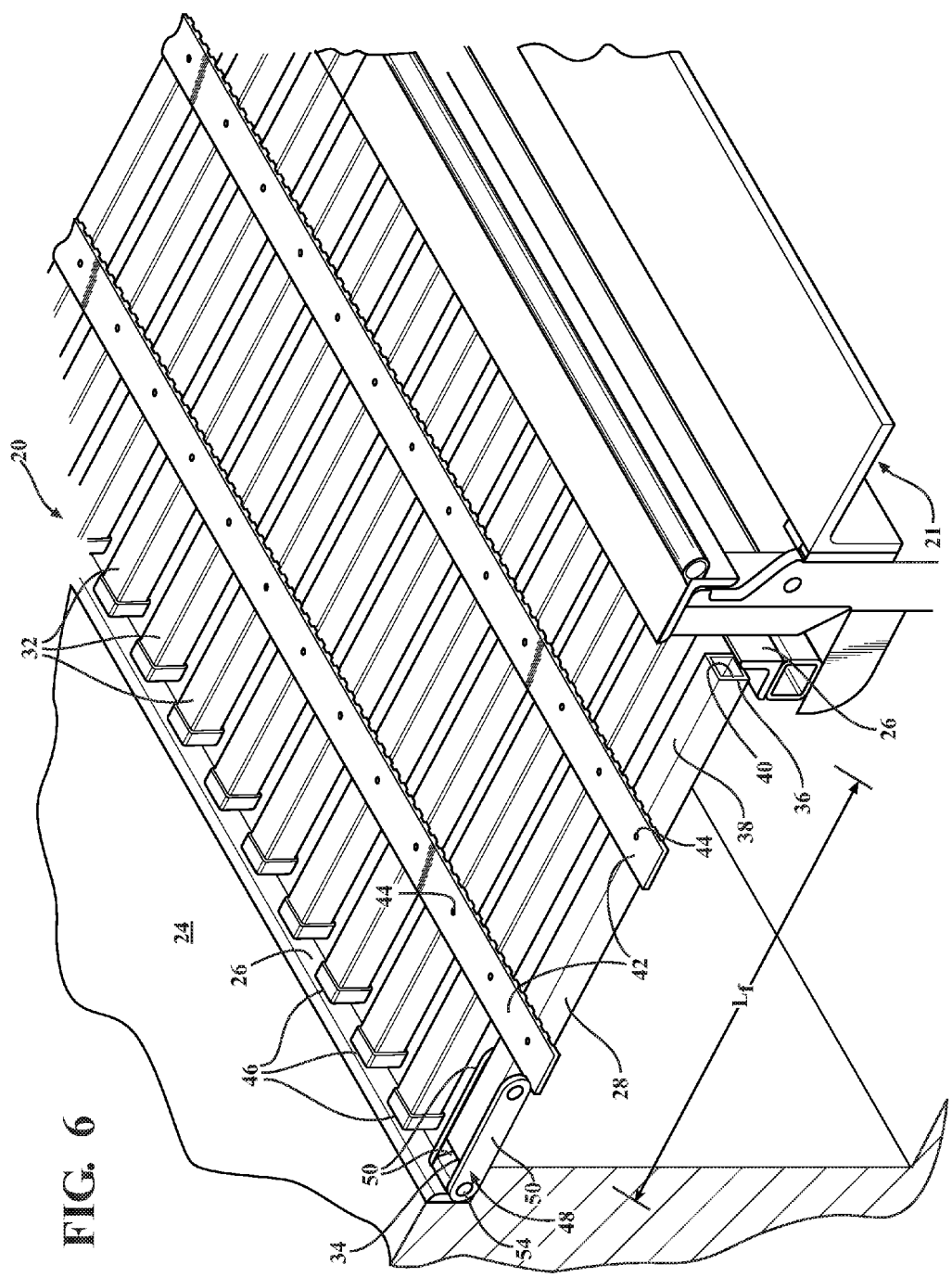
FIG. 6 is a partial perspective view of a grate assembly, a conveyor system, and a pit according to an aspect of the disclosure.
Figure 7A:
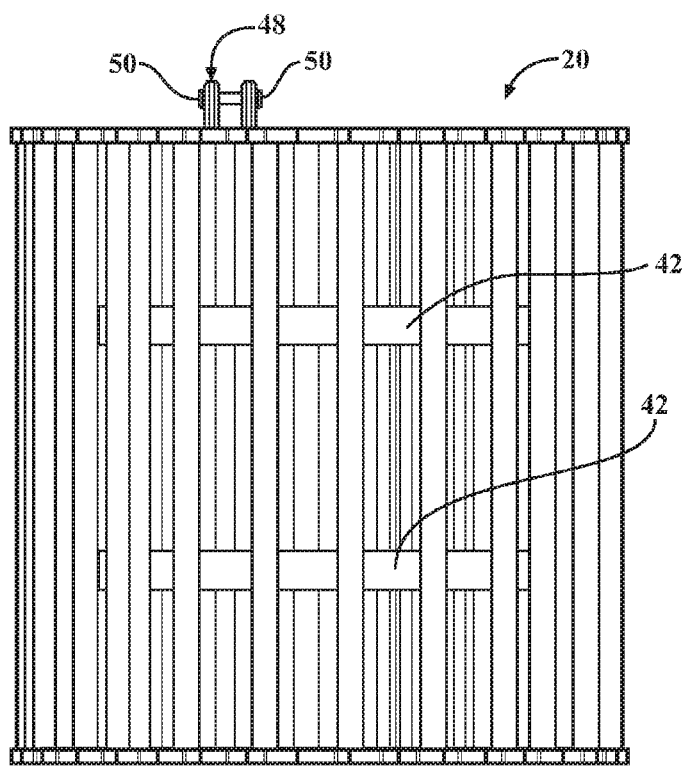
FIG. 7A is a side view of a grate assembly in a coiled position according to an aspect of the disclosure.
Figure 7B:
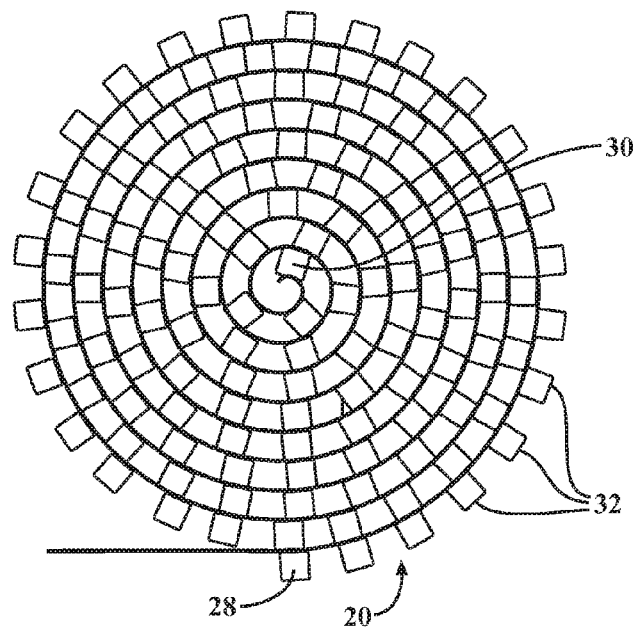
FIG. 7B is a top view of a grate assembly in a coiled position according to an aspect of the disclosure.
Figure 7C:
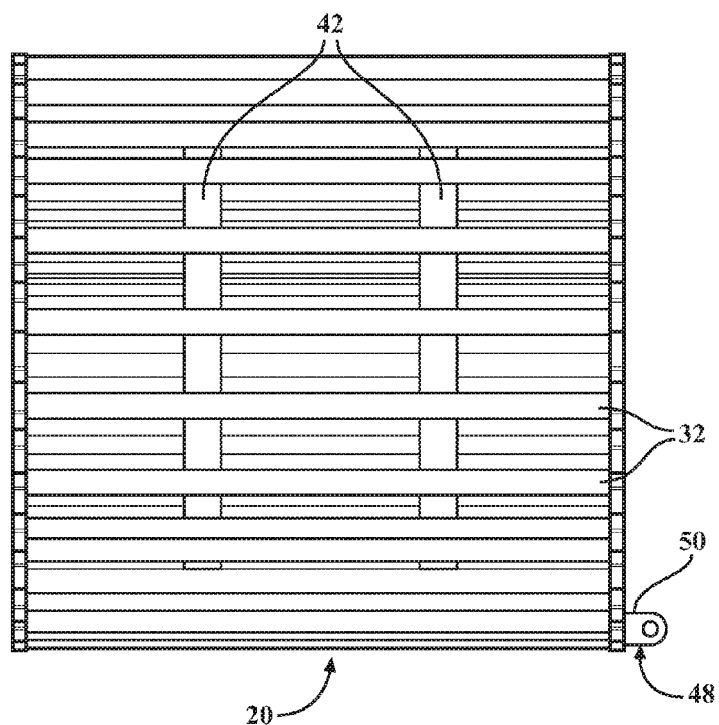
FIG. 7C is a front view of a grate assembly in a coiled position according to an aspect of the disclosure.
Figure 7D:
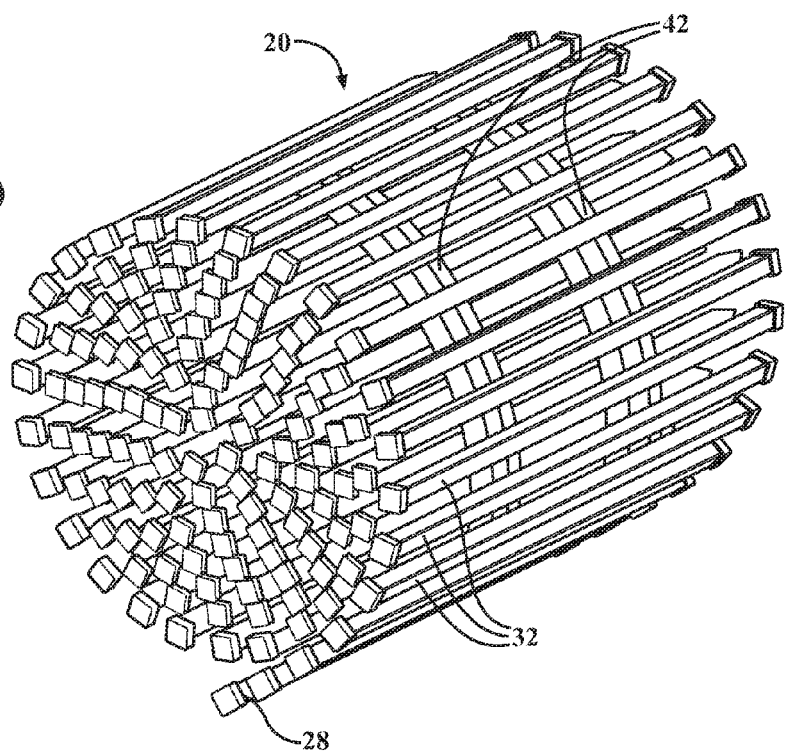
FIG. 7D is a perspective view of a grate assembly in a coiled position according to an aspect of the disclosure.

According to another aspect shown in FIG. 6, each of the rails 28, 30, 32 can include an outer wall 38 and an interior hollow 40 that extends therethrough between the first end 34 and the second end 36. According to a further aspect, the outer wall 38 can have a thickness of 0.0049 inches to advantageously ensure that the rails 28, 30, 32 are lightweight to allow for the grate assembly to be easily moved by a technician. It should be appreciated that the outer walls 38 could have any thickness. It should also be appreciated that the rails 28, 30, 32 could have other cross-sectional shapes such as, but not limited to, a circular or oval shape. Additionally, it should be appreciated that the hollow 40 could have any cross-sectional shape such as, but not limited to, a circular or oval shape. Further, it should be appreciated that one or more of the rails 28, 30, 32 could alternatively be constructed without a hollow 40 extending through an interior thereof, or the hollow 40 could extend through only a portion of one or more of the rails 28, 30, 32. Furthermore, it should be appreciated that the rails 28, 30, 32 could be made of other materials such as, but not limited to, an organic polymer material or wood.

Figure 8:
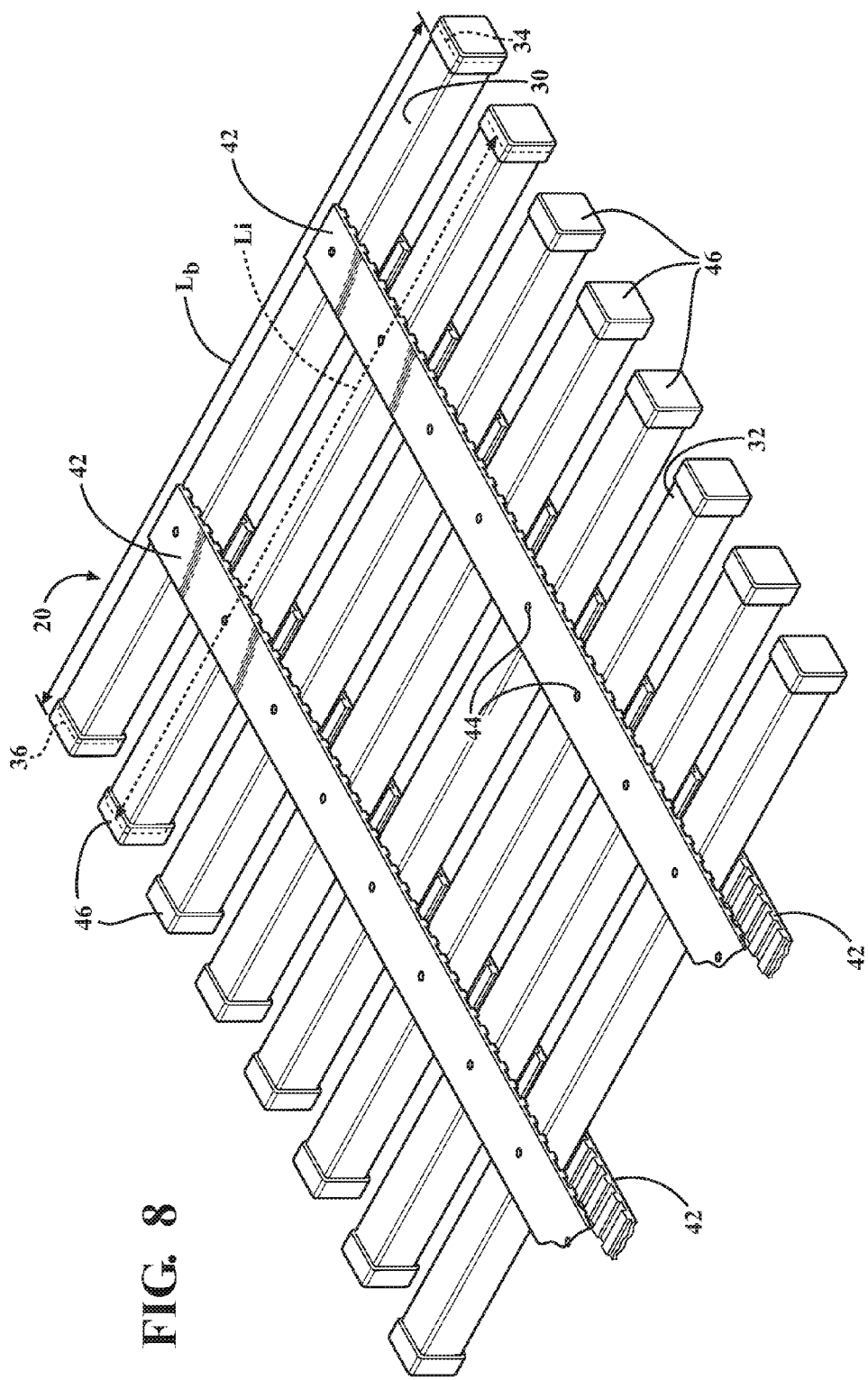
FIG. 8 is a partial perspective view of a grate assembly according to an aspect of the disclosure.
Figure 9:
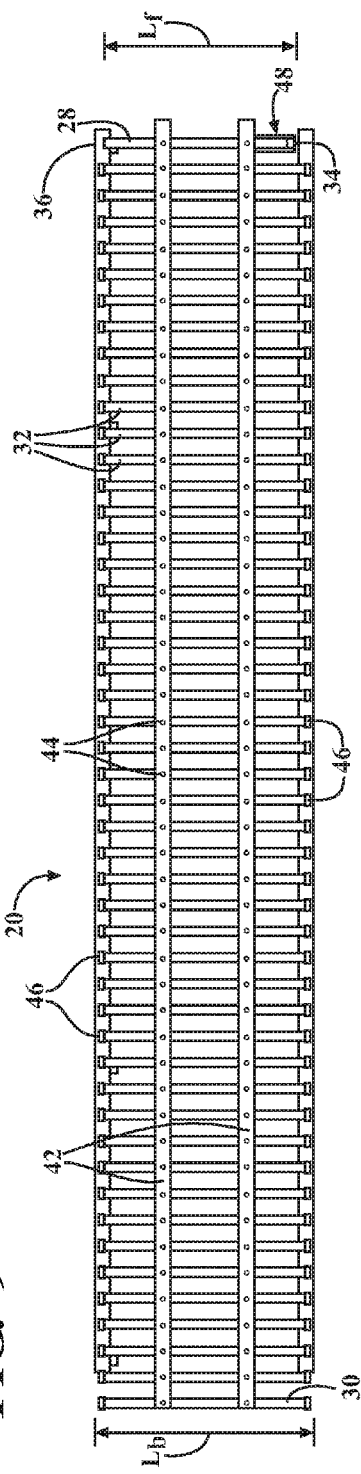
FIG. 9 is a top view of a grate assembly according to an aspect of the disclosure.
Figure 10:
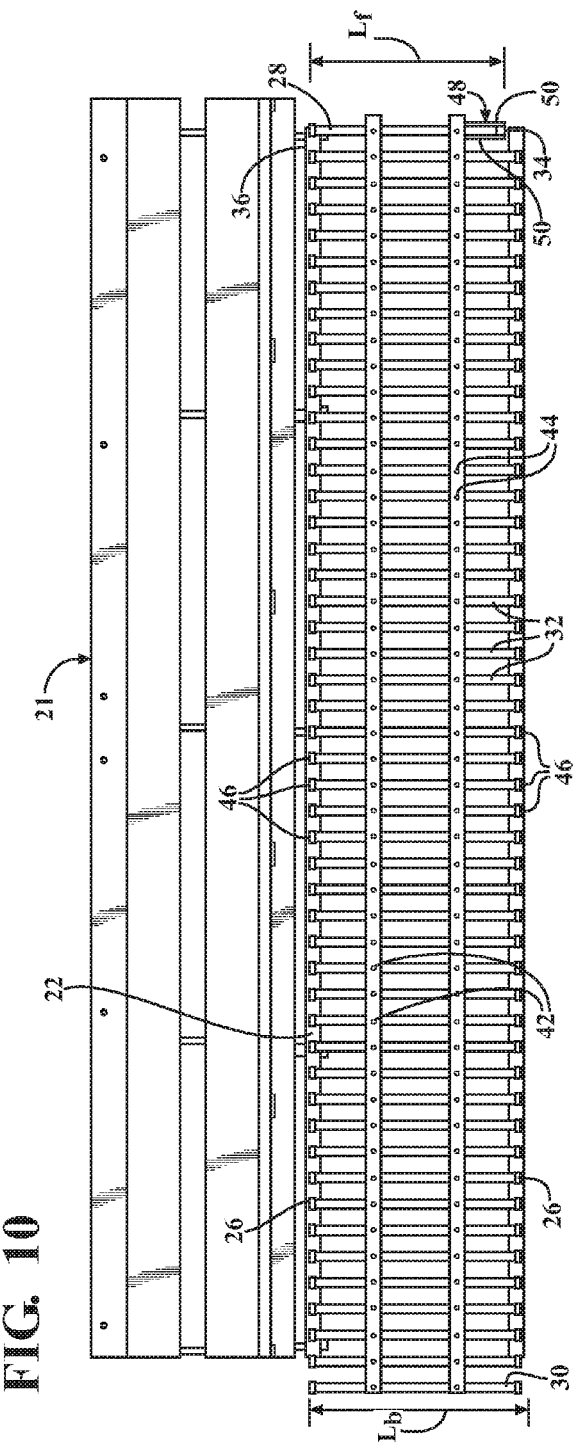
FIG. 10 is a top view of a grate assembly and a conveyor system according to an aspect of the disclosure.

According to an aspect, a grate apparatus 20 can consist of a front rail 28, a back rail 30, and a plurality of intermediate rails 32 disposed between the front rail 28 and the back rail 30. As shown in FIG. 6, according to an aspect, the front rail 28 can define a front length $L_f$ of the grate apparatus 20 between the first end 34 and the second end 36 of the front rail 28. Further, as shown in FIG. 8, the intermediate rails 32 can define an intermediate length Li between the first end 34 and the second end 36 of the intermediate rails 32. Also, as shown, the back rail 30 can define a back length $L_b$ of the grate apparatus 20 between the first end 34 and the second end 36 of the back rail 30. According to another aspect, the back length $L_b$ and the intermediate length Li may be equal to one another. According to a further aspect, the rails 28, 30, 32 can be configured such that they rest on an upper surface of the tracks 26, to advantageously ensure that the grate apparatus 20 remains flush with the floor 24 to prevent tripping hazards and to prevent the grate apparatus 20 from falling into the pit 22. Further, the intermediate length Li and the back length $L_b$ may be between 18 and 30 inches to also rest on the upper surface of conventional tracks 26 utilized in vehicle washes. It will be appreciated, however, that the rails 28, 30, 32 could have lengths $L_b$, $L_f$, Li with varying dimensions. It will be appreciated that other arrangements for supporting the grate assembly 20 on the tracks 26 could also be employed.

As best presented in FIGS. 4-10, according to an aspect, at least one strap 42 can be utilized to secure and connect the rails 28, 30, 32 to form a unitary and connected structure. According to another aspect, the strap 42 could be formed of flexible material that extends perpendicularly to and engages each of the rails 28, 30, 32 to connect the rails 28, 30, 32 and to maintain the rails 28, 30, 32 in spaced and parallel relationship with one another and to allow the rails 28, 30, 32 to be rolled over one another between a deployed and a coiled position through flexing of the strap 42. According to an additional aspect, a pair of straps 42 may be utilized to secure the upper surfaces of the each of the rails 28, 30, 32 with one strap being located adjacent the first end 34 of the rails and the other strap 42 being located adjacent the second end 36 of the rails such that the straps 42 are oriented in spaced and parallel relationship with one another. The utilization of multiple straps on, for example, the upper surface will limit bending of the grate assembly 20 in two dimensions.

According to still another aspect, the straps 42 could be utilized to secure both the upper surface and the lower surfaces of each of the rails 28, 30, 32. According to this aspect, the utilization of straps on both the upper and lower surfaces can allow for one strap 42 to be in tension while the other may be in compression to assist with the movement of the grate assembly 20 between the deployed and the coiled positions. For example, as the grate segment 20 is being unwound from a coiled position, the lower strap 42 could be in tension and serve to assist in the unwinding of the grate segment by urging the rails out of the coiled position. It should be appreciated that more than two straps 42 could be used, however the straps 42 should be wide enough or spaced far enough from one another to ensure that the rails 28, 30, 32 do not pivot relative to one another.

According to an aspect, the straps 42 could be formed of a flexible urethane material. However, it should be appreciated that the straps could be formed of other flexible materials including, but not limited to, a neoprene and fabric lamination. It should also be appreciated that the term flexible material could also encompass other configurations of the straps 42 that provide for flexing movement of the straps 42 such as, but not limited to, a linked chain of metal or organic polymeric material. According to a further aspect, the rails 28, 30, 32 may be spaced apart from one another by approximately 1.5 inches to ensure that they are able to be rolled over one another and to ensure that dust and other debris that may be present in the vehicle wash facility can pass between the rails 28, 30, 32 into the pit 22 when the grate apparatus 20 is disposed to cover the channel 22. It should be appreciated that the rails 28, 30, 32 could be spaced from one another by other distances.

According to an aspect, the grate assembly 20 can further include a plurality of fasteners 44 that each secures the straps 42 to one of the rails 28, 30, 32. The fasteners 44 may be a plurality of screws 44 that each threadedly extend through one of the rails 28, 30, 32 and one of the straps 42 to connect the rails 28, 30, 32 and straps 42. It should be appreciated that the other fasteners 44 could be used to connect the straps 42 and the rails 28, 30, 32 such as, but not limited to, adhesives or bolts 44 and nuts. It will be appreciated that a variety of other suitable securing mechanism may also be employed.

As best presented in FIGS. 5-10, according to an aspect, a cap 46 of organic polymer material may be disposed about the first and second ends 34, 36 of each of the intermediate and back rails 32, 30 for preventing the first and second ends 34, 36 of the intermediate and back rails 32, 30 from being damaged and for preventing debris from entering the hollows 40 of the rails 28, 30, 32. It should be appreciated that the cap 46 could be made of other materials such as, but not limited to, a metal material and that a cap 46 could be disposed about the ends 34, 36 of any other combination of the rails 28, 30, 32. According to an aspect, for purposes of aesthetics and durability, each of the rails 28, 30, 32 could be powder coated, including in a desirable color.

According to an aspect and as shown in FIGS. 4-7D, 9 and 10, a connector 48 may be associated with the front rail 28 for locking the front rail 28 to one of the tracks 26 to advantageously prevent the rails 28, 30, 32 from moving relative to the tracks 26 and floor 24. The utilization of a connector 48 can also serve to prevent the rails 28, 30, 32 from presenting a tripping hazard or from interfering with surrounding equipment. According to an aspect, the connector 48 can include a pair of legs 50 that are pivotally connected with the front rail 28 that extend in spaced and parallel relationship with one another for extending about a member 52 that extends perpendicular from one of the tracks 26 to lock the front rail 28 to the track 26. A pin 54 may slideably extend through the legs 50 and the member 52 to secure the front rail 28 to the member 52. The front length $L_f$ of the front rail 28 may be less than the intermediate and back lengths $L_i$, $L_b$ to accommodate the connector 48 and member 52 of the tracks 26. It should be appreciated that the connector 48 could have other configurations such as, but not limited to, a bolt that threadedly extends through the track 26 and rail. Further, it should be appreciated that a connector 48 could be connected with any number of the rails 28, 30, 32. It will also be appreciated that multiple connectors may be employed and that connectors may be utilized to secure other or additional rails as desired.

According to another aspect, a pivoting mechanism can be employed to assist in pivoting the coiled assembly from a horizontal orientation to a vertical orientation. The pivoting mechanism can consist of a hinge in communication with the back rail 30 and one or more intermediate rails 32. According to another aspect, the hinge can be connected to the back rail 30 and a fifth rail of the intermediate rails 32. Each of the hinges could be secured to the floor 24 of the vehicle wash facility or the pit 22 to allow the coiled assembly to pivot to an orientation where the first ends 34 are resting on the floor of the vehicle wash facility. According to another aspect, the hinges could communicate with the strap 42 located adjacent the hinge in certain locations. The utilization of the hinge also ensures that the grate assembly 20 will be properly aligned with both rails when it is pivoted downward and then unwound.

According to a further aspect, a method for closing and opening a pit 22 in a floor 24 of a vehicle wash facility is also included. According to an aspect, the method can include an initial step of unlocking the front rail 28 from the track 26. According to this aspect, the front rail 28 may be unlocked from the track 26 by removing the pin 54 from the legs 50 of the connector 48 and the member 52 and pivoting the legs 50 away from the track 26. According to still another aspect, the method can further include the step of rolling the plurality of rails 28, 30, 32 over one another in a direction from the front rail 28 toward the back rail 30 such that the rails are wound into a coiled position about a centerline that is generally parallel to the floor 24. When the rails are wound in this position, the pit 22 may be exposed. It will be appreciated that the step of rolling the plurality of rails 28, 30, 32 over one another can be advantageous over the grate segments of the prior art because it is easier for an technician to roll the rails 28, 30, 32 over one another than to pick up the relatively large grate segments of the prior art.

According to an aspect, the method can also include the step of rotating the coiled rails 28, 30, 32 so that the first end 34 of the rails 28, 30, 32 is engaging the floor 24 as shown in FIGS. 3A-3B and 7A-7D. As discussed above, the rotating can occur through the utilization of hinges secured to one or more of the rails to allow the coiled assembly to be easily pivoted out of the way and to an orientation where it will not unwind. By this orientation, the centerline of the coil may be oriented perpendicular to the floor 24 of the vehicle wash facility. It should be appreciated that by pivoting the rails 28, 30, 32 onto the floor 24 in the coiled position the grate apparatus 20 can be advantageously stored in a compact position out of the way with little effort. It should be appreciated that once the pit 22 is exposed, the channel 22 can be readily and easily cleaned.

According to a further aspect, the method can include the step of rotating the coiled grate assembly 20 about one or more hinges such that it is resting on part of the tracks 26. According to an aspect, the coiled grate assembly 20 can then be unwound so that the plurality of rails 28, 30, 32 are disposed linearly along and over the pit 22 in spaced and parallel relationship with one another to cover the pit 22. It should be appreciated that the step of disposing the rails 28, 30, 32 over the pit 22 may be generally performed after the pit 22 has been cleaned by a technician. The utilization of the hinges help align the ends 34, 36 of both rails with respect to the tracks 26 to ensure that the grate assembly 20 does not fall into the pit 22. According to an aspect, the step of disposing the plurality of rails 28, 30, 32 linearly along and over the pit 22 in spaced and parallel relationship with one another to close the pit 22 can include unrolling the plurality of rails 28, 30, 32 over the channel 22 from the back rail 30 to the front rail 28 into an uncoiled position. As an initial matter, the centerline can be oriented parallel to the ground for ease of the uncoiling process. It should be appreciated that unrolling the plurality of rails 28, 30, 32 may be generally easier and less time consuming for an operator to perform in comparison to placing the grate segments of the prior art over the pit 22. According to an aspect, the method can further include the step of locking the front rail 28 to one of the tracks 26. According to another aspect, this can be accomplished by locking the front rail 28 to the track 26 by pivoting the legs 50 of the connector 48 around the member 52 that extends from the track 26 and sliding the pin 54 through the legs 50 and the member 52 to lock the connector 48 to the track 26.

According to an aspect, a plurality of grate assemblies 20 may be disposed along the length of the pit 22 with the back rail 32 of one grate assembly 20 being located adjacent the front rail 28 of an adjacent grate assembly 20. To clean the pit 22, an operator can wind up each of the individual grate assemblies at one time before beginning the cleaning process or the operator may wind up each grate assembly 20 individually and clean the area of the pit 22 underlying that coiled up grate assembly 20 before unwinding it to cover the pit 22 and then moving onto the next assembly and repeating the process.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A vehicle wash, comprising:
   a pit defined by a floor;
   a pair of tracks disposed in spaced relationship with one another along a length of the pit;
   a grate apparatus including a plurality of rails constructed of a metal material, each of the plurality of rails having a first end configured to overlie one of the pair of tracks and a second end configured to overlie the other of the pair of tracks;
   the plurality of rails having an upper surface oriented to face away from the pit when the pit is covered and a lower surface oriented to face into the pit when the pit is covered;
   the plurality of rails fixedly secured to one other in generally parallel spaced apart relationship to form a unitary structure having a front rail, a back rails and a plurality of intermediate rails;
   the grate apparatus further including a plurality of elongated strap portions secured to at least one of the upper surface or the lower surface of each of the plurality of rails;
   wherein the plurality of strap portions are generally flexible such that the unitary structure can be moved from a generally unwound position where the plurality of rails are oriented generally parallel to ground to a wound position where the plurality of rails and the plurality of strap portions are coiled into a generally cylindrical shape.

2. The grate apparatus of claim 1, wherein the plurality of straps are formed of a material selected from at least one of the following: urethane, neoprene, or elastic.

3. The grate apparatus of claim 1, wherein the plurality of straps include at least one strap secured to the upper surface of each of the plurality of rails and at least one strap secured to the lower surface of each of the plurality of rails.

4. The grate apparatus of claim 1, wherein the plurality of rails are formed with a generally hollow interior.

5. A method of covering and exposing a pit disposed in a floor of a vehicle wash facility, the pit including a pair of opposing tracks each secured adjacent a side of the pit, the method comprising:

providing a grate assembly including:

a plurality of rung pieces extending between a first end and a second end, and having an upper surface and a lower surface between the first end and the second end;

a plurality of flexible straps fixedly securing the plurality of rung pieces into a unitary structure wherein the plurality of rung pieces are oriented in a generally parallel spaced apart relationship having a front rung piece, a back rung piece and a plurality of intermediate rung pieces;

disposing the grate assembly over the pit such that the first end of each of the plurality of rung pieces engages one of the pair of spaced apart tracks and the second end of each of the plurality of rung pieces engages the other of the pair of spaced apart tracks;

winding the grate assembly to a coiled position to expose the pit by rolling the rung pieces over one another in a direction from the front rung piece toward the back rung piece such that the grate assembly has a centerline that is oriented generally parallel to the floor of the vehicle wash facility;

pivoting the coiled grate assembly to a position adjacent the pit such that the first ends of the plurality of rung pieces engage the floor and the centerline of the coiled grate assembly is oriented generally perpendicular to the floor, and such that each of the rails extend generally perpendicularly to the floor between the first end and the second and in generally parallel relationship with the centerline.

6. The method of claim 1, further comprising:

unwinding the coiled grate assembly to cover the pit; and locking the front rail to at least one of the pair of parallel spaced apart tracks.

7. The method of claim 1, further comprising:

providing a plurality of grate assemblies to substantially cover the length of the pit such that the front rail of a first grate assembly is disposed adjacent a rear rail of a second grate assembly.

8. The method of claim 5, further comprising:

winding up each of the plurality of grate assemblies to expose the entire length of the pit.

9. A grate apparatus for covering a channel defined by a floor of a car wash including a pair of tracks disposed in spaced and parallel relationship with one another along the channel comprising;

a plurality of rails of a metal material and having a square shaped cross-section and extending in spaced and parallel relationship with one another between a first end and a second end, each of said rails defining an outer wall and a hollow extending therethrough between said first end and said second end, said outer wall having a thickness of 0.009 inches, said plurality of rails including a front rail and a back rail and a plurality of intermediate rails between said front rail and said back rail, said front rail defining a front length between said first end and said second end of said front rail, said intermediate rails defining an intermediate length between said first end and said second end of said intermediate rails, said back rail defining a back length between said first end and said second end of said back rail, said back length and intermediate length being equal to one another for allowing said tracks to fit between said tracks, said front length being less than said intermediate and back lengths, and characterized by, at least one strap of flexible material extending perpendicularly to and engaging each of said rails to connect said rails and to maintain said rails in spaced and parallel relationship with one another and to allow said rails to be rolled over one another into a coiled position, said flexible material being urethane, said strap including a pair of straps extending in spaced and parallel relationship with one another and spaced from said first and second ends of said rails, a plurality of fasteners each connecting one of said rails and one of said straps, said fasteners being a plurality of screws each threadedly extending through one of said rails and one of said straps to connect said rails and straps, a cap of organic polymer material disposed about said first and second ends of each of said intermediate and back rails for preventing said first and second ends from being damaged and for preventing debris from entering said hollows of said rails, a connector connected with said front rail for locking said front rail to one of the tracks, said connector including a pair of legs pivotally connected with said front rail extending in spaced and parallel relationship with one another for connecting with one of said tracks to lock said front rail to said track.

10. A method for closing and opening a channel in a floor of a car wash including a pair of tracks disposed in spaced and parallel relationship with one another along the channel using a plurality of rails including a front rail and a back rail and each of the rails extending between a first end and a second end in spaced and parallel relationship with one another, said method comprising the steps of;

disposing the plurality of rails linearly along and over the channel in spaced and parallel relationship with one another to close the channel, and characterized by, said step of disposing the plurality of rails linearly along and over the channel in spaced and parallel relationship with one another to close the channel includes unrolling the plurality of rails over the channel from the back rail to the front rail into an uncoiled position, locking the front rail to one of the tracks, unlocking the front rail from the track, rolling the plurality of rails over one another from the front rail toward the back rail into a coiled position to open the channel, placing the plurality of rails on the floor in the coiled position with the first end of the rails engaging the floor, and with each of the rails extend generally perpendicularly to the floor between the first end and the second end.

* * * * *